May 13, 1941.                C. L. BEAL                2,241,385
METHOD OF MAKING RUBBER ARTICLES
Filed Sept. 29, 1936
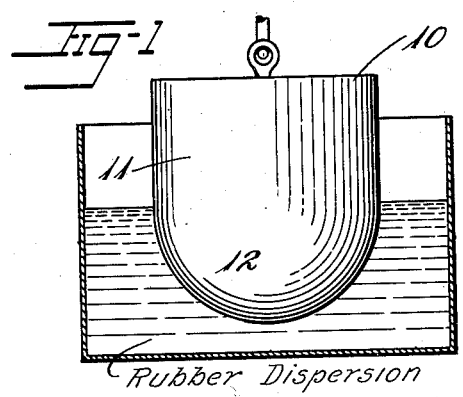
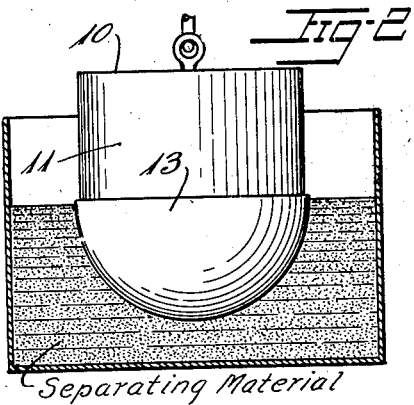
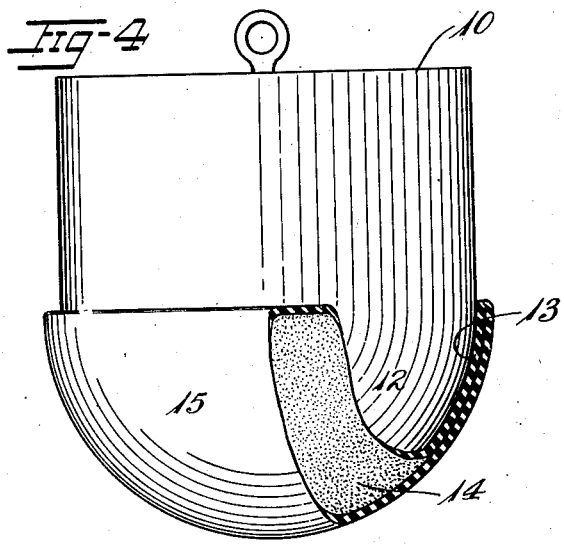
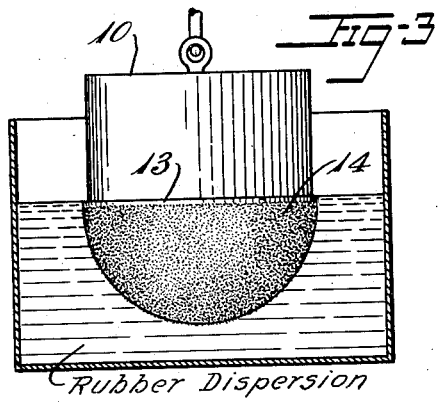
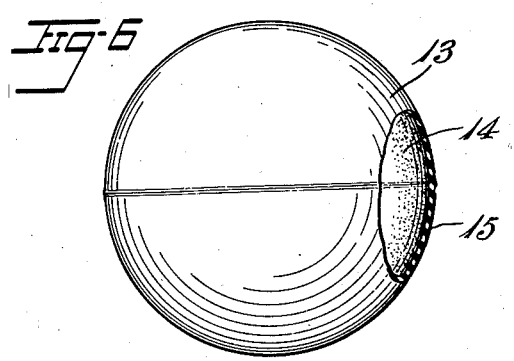
Inventor
Carl L. Beal Patented May 13, 1941

2,241,385

UNITED STATES PATENT OFFICE 2,241,385

METHOD OF MAKING RUBBER ARTICLES

Carl L. Beal, Cuyahoga Falls, Ohio, assignor to American Anode Inc., Akron, Ohio, a corporation of Delaware Application September 29, 1936, Serial No. 103,115

7 Claims. (Cl. 18—58)

This invention relates to the manufacture of rubber articles by a process in which a plurality of rubber deposits are produced in superposed relation, cohesive union between the deposits being prevented in certain areas while being permitted in other areas, to produce an integral one-piece rubber article having an internal fluid-tight chamber which, for example, may be inflated. The invention is especially useful in manufacturing hollow articles having a shape capable of division into substantially symmetrical halves such as toy balls, but is not restricted to such use and obviously may be employed in manufacturing a wide variety of articles for various purposes.

The invention as exemplified by a preferred process applied to the manfacture of a simple article, such as a toy ball, will be described with reference to the accompanying drawing, of which Figs. 1, 2, and 3 are similar sectional elevations illustrating three steps in the process and showing a deposition form being successively immersed in a series of coating materials;

Fig. 4 is an elevation showing the form with the several coatings thereon, the coatings being broken away for clarity of illustration;

Fig. 5 is a perspective view of illustrating the step of inflating the ball;

Fig. 6 is an elevation showing a finished hollow rubber ball made according to the present process.

In manufacturing a hollow spherical rubber ball by the preferred process of the present invention, I utilize a deposition form 10, made of any suitable material such as wood, glass, Bakelite, porcelain, rubber, or the like, and having an upper cylindrical surface 11 merging with a lower hemi-spherical surface 12. The form is immersed, hemi-spherical end down, in a liquid dispersion of rubber to a point slightly above the top of the hemi-spherical surface (Fig. 1), and a deposit of rubber 13, of a desired thickness is produced upon the immersed portion of the form by any well-known conventional procedure, but preferably with the aid of a coagulant for the liquid dispersion preliminarily applied to the form in the manner described in U. S. Patent No. 1,908,719. After the rubber deposit has acquired a self-sustaining consistency, and preferably after partial but not complete drying of the deposit to a tacky state favorable to cohesion with a subsequently superposed similar deposit, the entire exposed surface of the rubber, except for the relatively narrow band above the hemi-spherical portion, is coated with a layer of separating material capable of preventing cohesive union between the underlying rubber and a subsequently superposed similar deposit of rubber. A coating 14 of pulverulent water-insoluble material such as soapstone, clay, diatomaceous earth, magnesium carbonate, mica, graphite or the like is preferred for this purpose and may be most conveniently applied by immersing the form and associated rubber deposit to a suitable depth (Fig. 2) in a suspension of the pulverulent material in a suitable volatile liquid vehicle such as water or an organic solvent such as alcohol or acetone and, after removal, evaporating the volatile solvent from the coating. A coagulant for the liquid dispersion subsequently to be applied may if desired be incorporated in the layer of separating material to facilitate subsequent deposition of rubber from the liquid dispersion. For example, a coating composition consisting of 60 grams of finely divided soapstone suspended in one liter of acetone containing 300 grams of a latex-coagulating salt such as calcium nitrate is quite satisfactory if an ordinary compounded liquid rubber latex is to be used in producing the subsequent rubber deposit. Obviously, however, the pulverulent material may be dusted in dry form on the rubber deposit or otherwise applied, and other separating materials such as cellulose ester films deposited from solution, or layers of paper, or other suitable separating layers may be utilized. A thin film of an ordinary cellulose ester lacquer is very satisfactory for this purpose and is preferred in making semi-transparent articles where a powdery residue for example, might detract from the appearance of the finished product.

After application of the separating layer, the form together with the associated coatings is immersed in a liquid dispersion of rubber to the top edge of the first rubber deposit (Fig. 3) and a second deposit of rubber 15 is produced over the underlying deposit and separating coating. The combined deposits then are washed and thoroughly dried upon the form, producing an integral cohesive union between the two deposits around the top edges where no separating material was applied, but not elsewhere, as more clearly shown in Fig. 4.

The double-walled cupped article so produced next is stripped from the form and distended, either manually or, preferably, by inflation which may be accomplished by inserting a hypodermic needle 16 through one wall and injecting a suitable volume of air or other inert gas and then sealing the puncture with a drop of latex or rubber cement, or by including a gas-forming ingredient such as ammonium bicarbonate or ammonium nitrite in the separating layer and heating to evolve the required inflating gas. In either event, the rubber is vulcanized, preferably after inflation, and if necessary, the vulcanized article is trimmed at the central line of joinder to produce the finished ball illustrated in Fig. 6.

The term "liquid dispersion of rubber" and the like has been used in the specification and claims in a broad sense to include all naturally occurring and artificially prepared flowable dispersions of rubber and analogous natural or synthetic gums and resins, in liquid vehicles, whether solvents or non-solvents for rubber. Such liquid dispersions may include any desirable stabilizing, compounding, vulcanizing, age-resisting, or coloring agents, and may be vulcanized, unvulcanized, thickened, thinned, concentrated, or otherwise conditioned for use according to well known practices.

In addition to the manufacture of symmetrical inflated articles such as the spherical ball herein described, the principles of the present invention obviously may be applied to the manufacture of many other types of inflated or inflatable articles as well as articles in which no inflation is involved but which require a chamber or internal pocket within integral rubber walls. All such varied applications, as well as the numerous modifications and variations in details of the procedure and materials described which will occur to the skilled artisan, are included within the spirit and scope of the invention as defined by the appended claims.

I claim:

1. The method of making a hollow rubber article comprising symmetrical halves, which comprises providing a form having a deposition surface shaped to produce a symmetrical half of the article, producing upon the form, by deposition directly from a liquid dispersion of rubber, a deposit of rubber constituting substantially a symmetrical half of the article, treating substantially all the exposed surface of the deposit, except for a relatively narrow zone adjacent the edge thereof, in such manner as substantially to destroy the ability of the rubber cohesively to unite with a subsequently superposed deposit of rubber, producing over the first deposit, by deposition directly from a liquid dispersion of rubber, a second deposit of rubber constituting a second substantially symmetrical half of the article in cohesive union with the first deposit along the said narrow zone but not elsewhere, and then distending the article.

2. The method of making a hollow rubber ball which comprises providing a form having a substantially hemispherical deposition surface, producing upon the form, by deposition directly from a liquid dispersion of rubber, a deposit of rubber constituting substantially a symmetrical half of the ball, treating substantially all the exposed surface of the deposit, except for a relatively narrow zone extending around the deposit adjacent the edge thereof, in such manner as substantially to destroy the ability of the rubber cohesively to unite with a subsequently superposed deposit of rubber, producing over the first deposit, by deposition directly from a liquid dispersion of rubber, a second deposit of rubber constituting a second substantially symmetrical half of the ball in cohesive union with the first deposit along the said narrow zone but not elsewhere, and then distending the cohered halves to produce a ball.

3. The method of making a rubber article which comprises depositing rubber directly from liquid rubber latex upon a form to produce a deposit of rubber constituting a portion of the article, applying to a substantial portion but not all the exposed surface of the said deposit a coating of a composition containing a latex coagulant and pulverulent material adapted to prevent cohesive union between the said deposit and a subsequently superposed deposit of rubber, and then associating the rubber deposit so coated with liquid rubber latex to deposit thereover a second deposit of rubber in cohesive union with uncoated portions of the first deposit.

4. The method of making a rubber article which comprises producing a deposit of rubber by deposition from a liquid dispersion of rubber upon a form, applying to a substantial portion but not all of the said deposit a coating containing a gas-producing agent and a separating material adapted to prevent cohesive union between the said rubber deposit and a subsequently superposed similar deposit, producing over the first deposit, by deposition from a liquid dispersion of rubber, a second deposit of rubber in cohesive union with uncoated portions of the first deposit, whereby an integral article having an internal gas-tight chamber is produced, and producing gas from said gas-producing agent within the chamber to distend the article.

5. The method of producing a hollow rubber article comprising symmetrical halves which comprises producing a concavo-convex rubber sheet constituting substantially a symmetrical half of the article, producing a similarly configured second concavo-convex rubber sheet in contiguous nested relation with the first sheet, integrally joining the two sheets at their contiguous edges to provide a fluid-tight hollow structure, and expanding the nested structure whereby the concave surface of the inner nested half becomes convex.

6. The method of making a rubber article which comprises depositing rubber directly from liquid rubber latex to produce a deposit of solid rubber composition constituting a portion of the article, applying to a substantial portion but not all the exposed surface of the said deposit, while the rubber is in a normally cohesive condition, a fluid composition having substantially no chemical effect on solid rubber and comprising pulverulent solid material suspended in a volatile liquid vehicle, evaporating at least a part of the liquid vehicle to produce a coating adapted, by physical separation, to prevent cohesive union between the said deposit and a subsequently superposed deposit of rubber, and then associating the so coated rubber deposit with liquid rubber latex to deposit thereover a second deposit of rubber in cohesive union with the uncoated but not the coated portion of the first deposit.

7. The method of making a rubber article which comprises depositing rubber directly from liquid rubber latex to produce a deposit of solid rubber composition constituting a portion of the article, applying to a substantial portion but not all the exposed surface of the said deposit, while the rubber is in a normally cohesive condition, a fluid composition having substantially no chemical effect on solid rubber and comprising pulverulent solid inert material and a coagulant for liquid rubber latex suspended in a volatile liquid vehicle, evaporating at least a part of the liquid vehicle to produce a coating adapted, by physical separation, to prevent cohesive union between the said deposit and a subsequently superposed deposit of rubber, and then associating the so coated rubber deposit with liquid rubber latex to deposit thereover a second coagulated deposit of rubber of substantial thickness in cohesive union with the uncoated but not the coated portion of the first deposit.

CARL L. BEAL.